United States Patent [19]

Tachikawa

[11] Patent Number: 5,649,497

[45] Date of Patent: Jul. 22, 1997

[54] SEWING APPARATUS

[75] Inventor: Osamu Tachikawa, Tokyo, Japan

[73] Assignee: Juki Corporation, Tokyo, Japan

[21] Appl. No.: 574,966

[22] Filed: Dec. 19, 1995

[30] Foreign Application Priority Data

Dec. 19, 1994 [JP] Japan .................................. 6-315367

[51] Int. Cl.$^6$ .............................. D05B 21/00; B23C 1/16
[52] U.S. Cl. ............................... 112/470.05; 112/470.06; 409/79
[58] Field of Search .................... 112/470.06, 470.09, 112/470.05, 470.01, 102.5, 470.07, 475.03, 475.04, 475.05; 409/79, 84

[56] References Cited

U.S. PATENT DOCUMENTS

| 4,130,073 | 12/1978 | Kimura et al. | 112/470.07 X |
| 5,205,232 | 4/1993 | Sadeh et al. | 112/475.03 |

FOREIGN PATENT DOCUMENTS

| 61-50473 | 11/1986 | Japan . |
| 2-172491 | 7/1990 | Japan . |
| 5-76672 | 3/1993 | Japan . |
| 6-262420 | 9/1994 | Japan . |

*Primary Examiner*—Peter Nerbun
*Attorney, Agent, or Firm*—Morgan, Lewis and Bockius, LLP

[57] ABSTRACT

A sewing apparatus is provided with an X-Y unit 4 for horizontally moving a cassette in relation to a sewing machine 3, memory 23 for holding sewing data for driving the X-Y unit 4 in accordance with a sewing pattern and feeding data for feeding only the cassette without entailing stitching action, a drill 10 for grooving a slot in the cassette, a vertical drive mechanism 18 for vertically moving the drill 10, and a CPU 22. The drill 10 is moved downward while rotating, and the X-Y unit 4 is actuated on the basis of the sewing data to form the slot. After the drill 10 has become deactivated and moved upwards, the cassette is fed on the basis of the feeding data. Since the CPU 22 executes the rotation and downward movement of the drill 10 at the time of grooving and the upward movement and interruption of rotation of the drill 10 at the time of feeding, switching operation required to rotate, move downward, move upward and to stop the drill 10 becomes unnecessary.

7 Claims, 8 Drawing Sheets

SEWING APPARATUS

BACKGROUND OF THE INVENTION

1. Field of the Invention

This invention relates to a sewing apparatus and, more particularly, to a sewing apparatus having a milling drill for grooving a slot in a cassette, which holds work to be sewed, in accordance with a sewing pattern.

2. Description of Related Art

Figure 7:
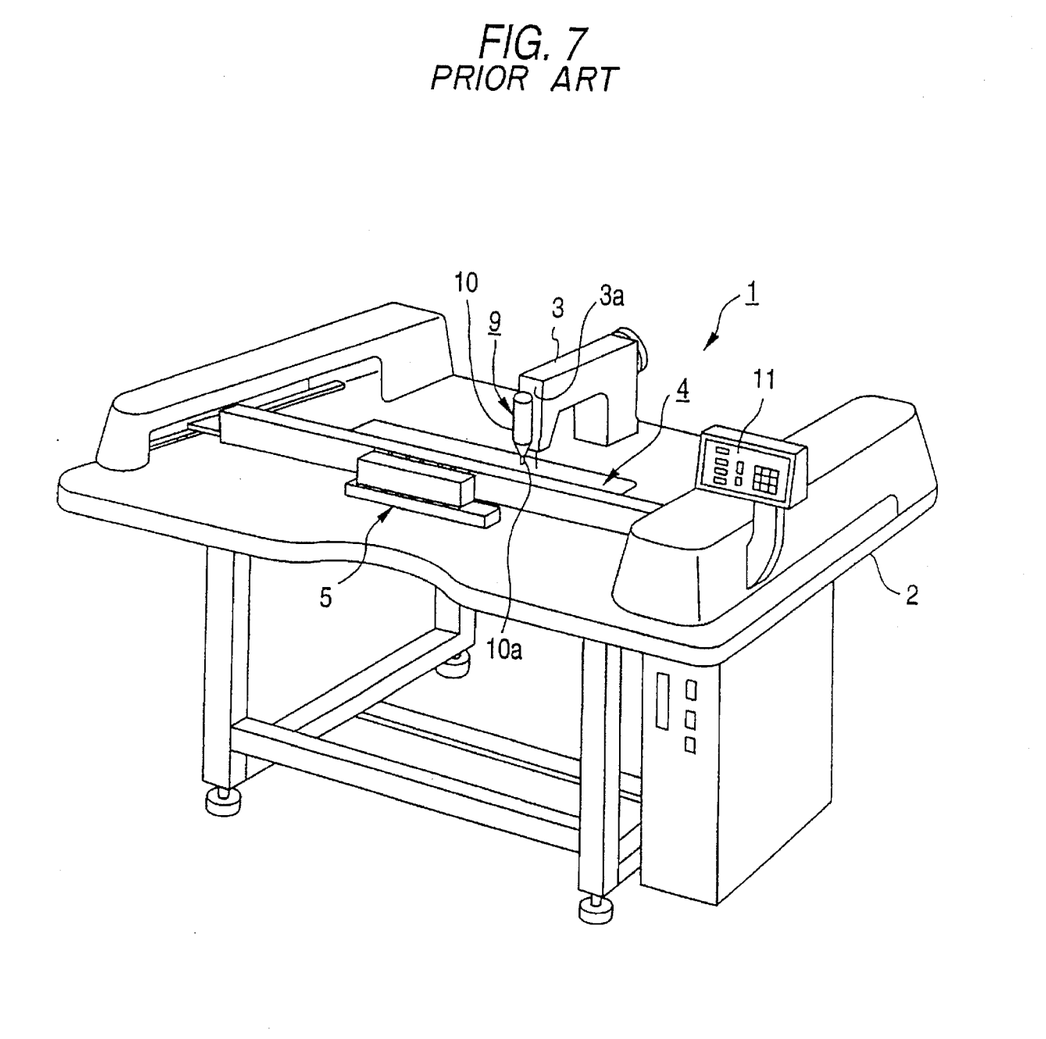
FIG. 7 is a perspective view showing the entirety of a conventional sewing apparatus.
Figure 8:
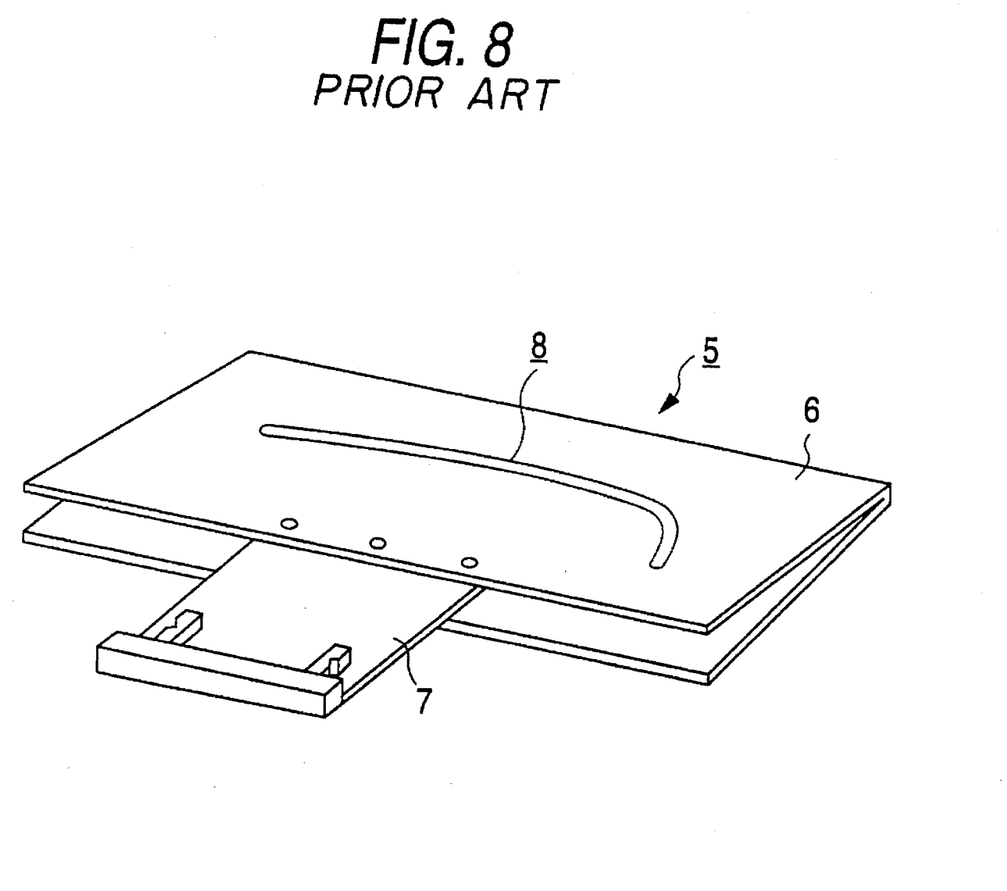
FIG. 8 is a perspective view showing a cassette.

A sewing apparatus of that type is known, for instance, as shown in FIG. 7. As shown in FIG. 7, a sewing apparatus 1 comprises a table 2, a sewing machine 3 disposed on the table 2, and an X-Y moving unit 4 disposed on the same. This X-Y moving apparatus 4 moves a cassette 5 which holds work to be sewed in X and Y directions relative to the sewing machine 3, whereby the work is sewed into a predetermined pattern. As shown in FIG. 8, the cassette 5 includes, for example, a holding plate 6 for holding work and a fixing plate 7 for fixing the holding plate 6 to the X-Y moving unit 4 of the sewing apparatus 1. A slot 8 corresponding to a sewing pattern is grooved in the holding plate 6. This slot 8 is grooved using a milling unit 9 attached to the top part 3a of the sewing apparatus 1 before actually sewing the work.

This milling unit 9 includes a milling drill 10 and a vertical driving mechanism (not shown) for vertically moving the milling drill 10, and an end mill 10a for grooving purposes which is fixedly inserted into the lower end of the milling drill 10. The rotation, interruption, and vertical movement of the milling drill 10 are effected as a result of operation of a drill rotation/stop switch and a drill up/down switch provided on a control panel 11 by an operator.

To groove a slot, the milling drill 10 is moved downwardly so as to make the tip end of the end mill 10a create a hole at a predetermined location (a processing start position) of the cassette 5. Thereafter, the start switch of the control panel 11 is turned on to actuate the X-Y moving unit 4, so that the cassette 5 is moved in the X and Y directions. As a result, the grooving of a slot for one sewing pattern is automatically carried out. At this time, the X-Y moving unit 4 moves the cassette 5 based on sewing data which the sewing machine 3 utilizes to sew the work.

If the slot is grooved based on sewing data for one sewing pattern that includes the repetition of sewing action and feeding action for feeding the cassette without stitching action of a needle, the milling drill 10 is stopped and moved upwards by operating the drill rotation/stop switch and the drill up/down switch on the control panel 11 after the slot for the beginning of the sewing pattern (for example, area A shown in FIG. 6) has been grooved. Then, a feed switch (not shown) on the control panel 11 is turned on to actuate the X-Y moving table 4, whereby the cassette 5 is fed over a predetermined distance to the next sewing start position (for example, position P shown in FIG. 6). The feeding action of the X-Y moving unit 4 at this time is carried out based on feeding data included in the sewing data.

The milling drill 10 moves downwards and then rotates as a result of the operation of the drill rotation/stop switch and the drill up/down switch on the control panel 11 by the operator. Accordingly, a hole is formed at the machining start position on the cassette 5. The start switch on the control panel 11 is then turned on, so that the X-Y moving unit 4 is actuated to move the cassette 5 in accordance with the sewing pattern. In this way, the grooving of the cassette 5 for the next portion of the sewing pattern (for example, area B shown in FIG. 6) is automatically effected.

Figure 6:
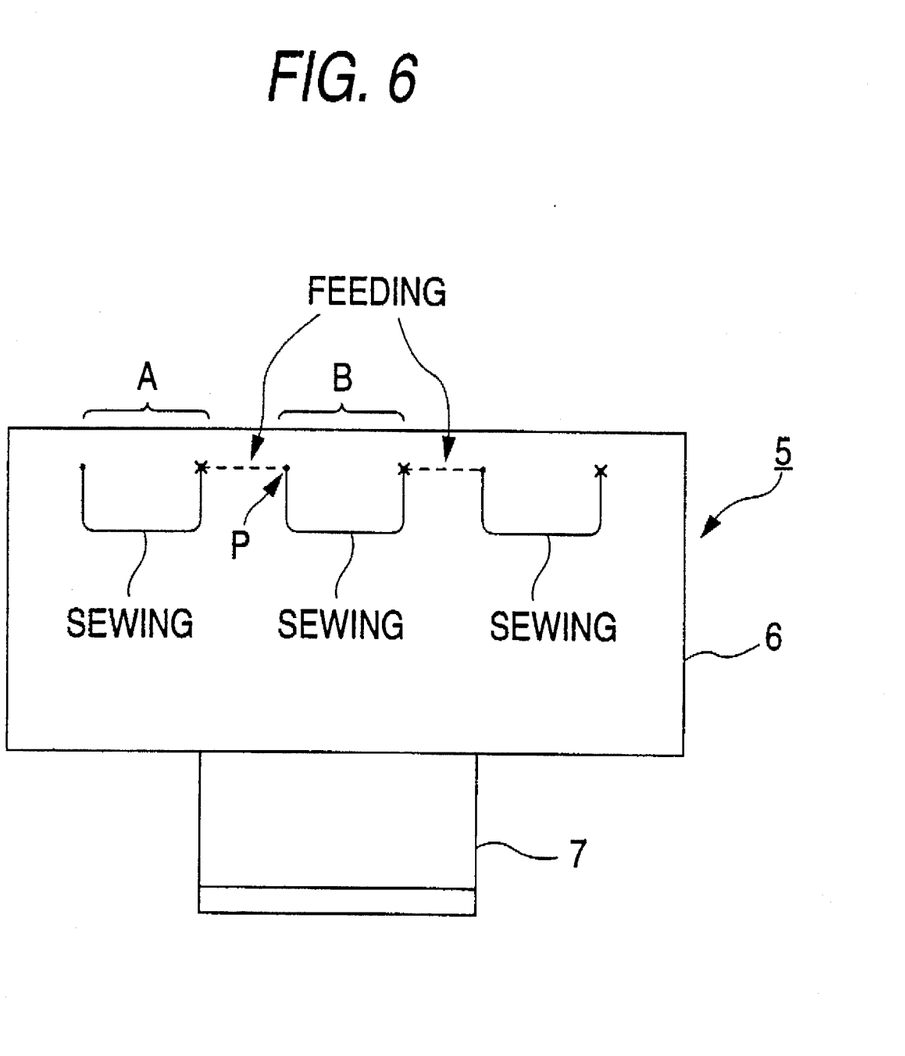
FIG. 6 is a plan view showing one example of a cassette having a plurality of slots.

A plurality of slots 8 are grooved in the cassette 5, as shown for example in FIG. 6, through the repetition of the above mentioned operations.

However, in the case of sewing pattern data that include repetition of sewing action and feeding action, it is necessary for the operator to operate the switches on the control panel 11 in order to downwardly move and rotate the milling drill 10 and start the feeding action of the X-Y moving apparatus 4 every time a slot for an area to be sewed is grooved. Further, every time the cassette is fed after the slot for one pattern has been grooved, it is necessary for the operator to operate the switches on the control panel 11 so as to stop and move the milling drill 10 upwards and start the feeding action of the X-Y moving unit 4. In this way, the grooving of the slot based on the above mentioned sewing pattern data involves frequent switching action, which results in a physical burden on the operator.

SUMMARY OF THE INVENTION

The present invention is conceived in view of the foregoing drawback in the conventional art and is, as its object, to provide a sewing apparatus which requires a reduced number of switching operations when grooving a slot in a cassette for holding work to be sewed in accordance with a sewing pattern and which is capable of alleviating a physical burden on the operator.

The above object is achieved by a sewing apparatus, according to one aspect of the present invention, comprising:

a sewing mechanism;

a cassette holding a work to be sewed into a pattern;

an X-Y unit for moving the cassette in a horizontal direction in relation to the stitching mechanism;

memory means for storing sewing data for actuating the X-Y unit in accordance with a sewing pattern and feeding data for feeding the X-Y unit;

a milling drill for grooving the cassette to create a slot;

a vertical drive mechanism for vertically moving the milling drill, wherein the milling drill is rotated and moved downward by the vertical drive mechanism and, concurrently, the X-Y unit is actuated based on the sewing data while the milling drill is grooving the cassette so as to form the slot in accordance with the sewing pattern, and wherein the rotation of the milling drill is stopped while being moved upward by the vertical drive mechanism and, concurrently, the X-Y unit is actuated to feed the cassette based on the feeding data;

drill control means which drives the vertical drive mechanism downwardly as well as starts the rotation of the milling drill when the X-Y unit is actuated on the basis of the sewing data fetched from the memory means, and which stops the rotation of the milling drill as well as upwardly drives the vertical drive mechanism when the X-Y unit is actuated on the basis of the feeding data fetched from the memory means.

In the sewing apparatus of the present invention, the drill control means drives the vertical drive mechanism downwardly as well as starts the rotation of the milling drill when actuating the X-Y unit on the basis of the feeding data, which makes it unnecessary for the operator to perform switching action for rotating and moving downwards the milling drill every time a slot is grooved.

Further, the drill control means stops the rotation of the milling drill as well as drives the vertical drive mechanism upwardly when actuating the X-Y unit on the basis of the feeding data, thereby rendering switching action for stopping the rotation and starting upward movement of the milling drill needed for each grooving operation unnecessary.

Therefore, even when grooving is repeatedly carried out on the basis of the sewing data and the feeding data, grooving is automatically carried out so long as the operator performs an operation for starting the grooving at the outset.

DETAILED DESCRIPTION OF THE PREFERRED EMBODIMENTS

With reference to FIGS. 1 to 5, a sewing apparatus according to a preferred embodiment of the present invention will now be described. The sewing apparatus of the present invention can be basically formed so as to have the similar configuration and appearance to the conventional sewing apparatus shown in FIG. 7. For this reason, the same reference numerals are provided to designate corresponding elements, and their explanation will be omitted as required.

Figure 1:
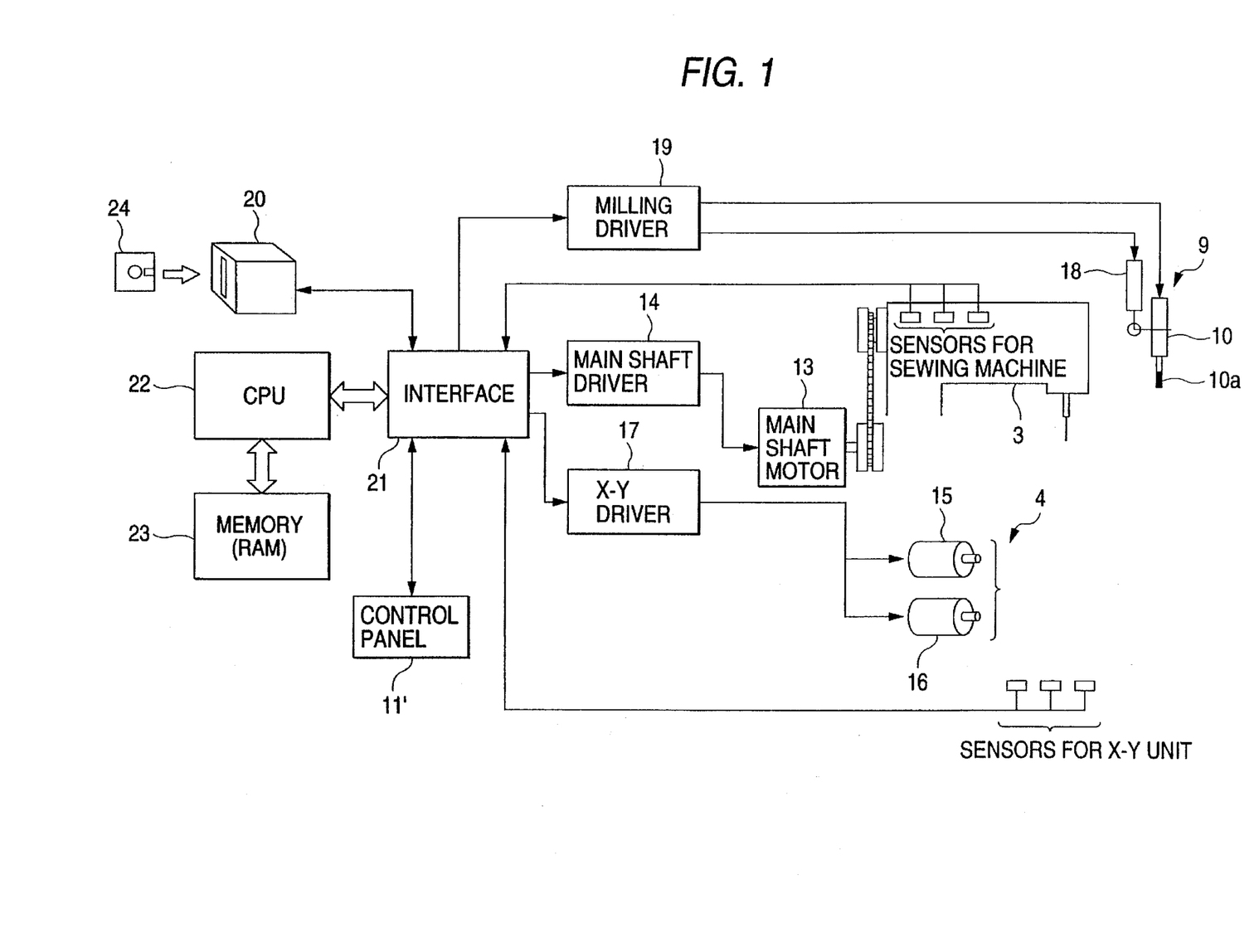
FIG. 1 is a block diagram showing a sewing apparatus according to one embodiment of the present invention.

FIG. 1 shows one example of a control system of the sewing apparatus of the present embodiment. This sewing apparatus is provided with a sewing machine 3, a main shaft driver 14 for driving a motor 13 coupled to the main shaft (not shown) of the sewing machine 3, an X-Y driver 17 for driving an X-axis drive motor 15 for moving an X-Y moving unit 4 in the X direction and a Y-axis drive motor 16 for moving the X-Y moving unit 4 in the Y direction, a milling driver 19 for driving a milling drill 10 of a milling unit 9 and a vertical drive mechanism (an air cylinder) 18, a floppy disk driver 20, and a control panel 11'. These units are connected to a CPU 22 via an interface unit 21. The CPU 22 is further connected to a RAM 23.

The RAM 23 has regions for temporarily holding sewing data and feeding data read from the floppy disk (FD) 24, and a variety of registration and setting data input through the control panel 11'.

Figure 2:
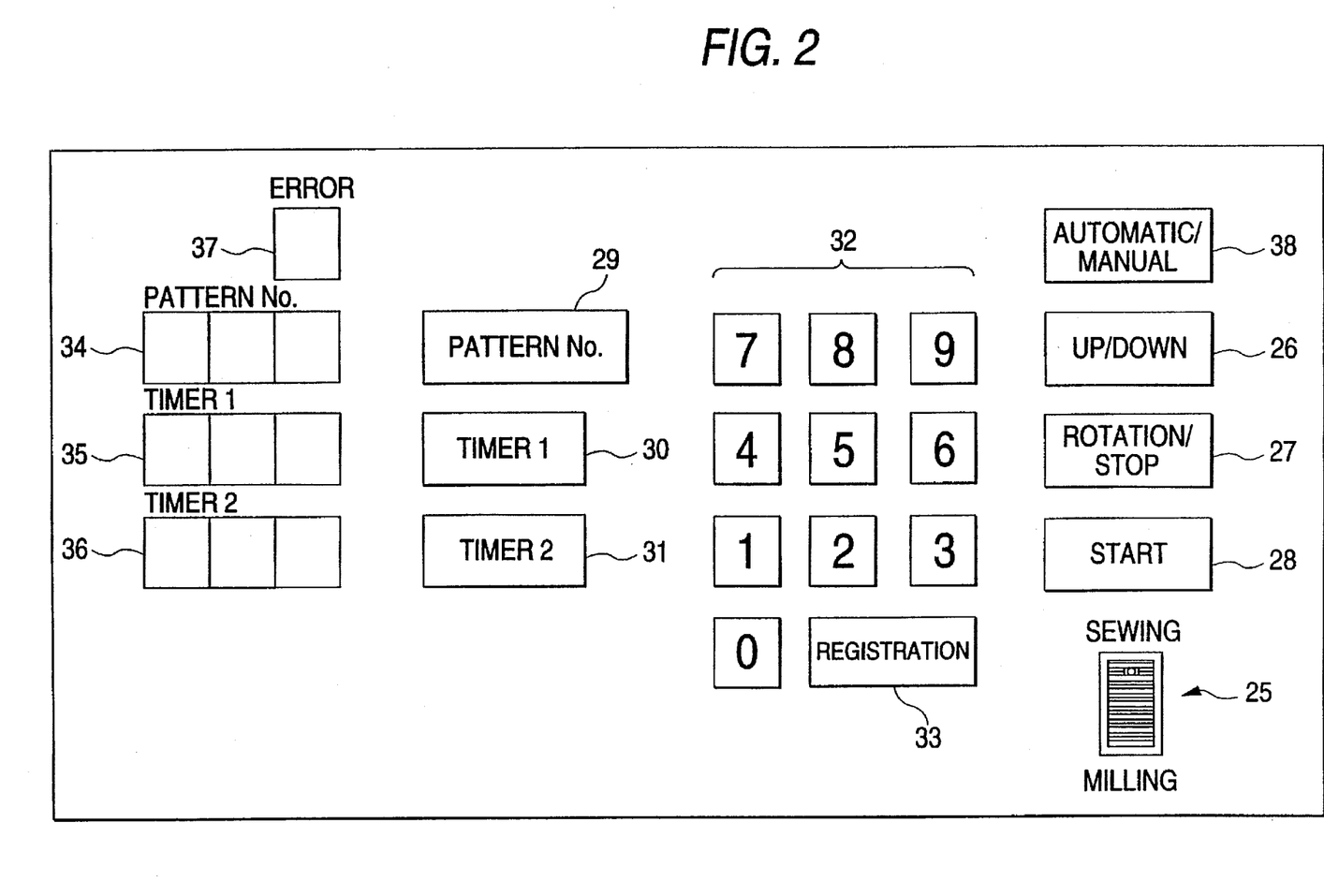
FIG. 2 is a plan view showing a control panel of the sewing apparatus of the embodiment.

As shown in FIG. 2, the control panel 11' comprises: a mode selection switch 25 for switching between sewing mode and grooving (milling) mode; switches used for grooving (a drill up/down switch 26, a drill rotation/stop switch 27, and a start switch 28); a pattern number switch 29 for selecting pattern data; a first timer switch 30 for setting a time t1 from the start of downward movement of the milling drill and the start of feeding action; a second timer 31 for setting a time t2 from the start of upward movement of the milling drill 10 to the start of feeding action; numeric keys 32 from 0–9, a registration key 33; and an automatic/manual mode changeover switch 38. Further, a pattern number display 34, a timer display 35 associated with the first timer switch 30, and a timer display 36 associated with the second timer switch 31 are disposed for displaying results of setting by the side of the pattern number setting switch 29, the first timer switch 30, and the second timer switch 31. An error display is provided upward the first timer display 35.

In the case of this control panel 11', the first timer switch 30 and the second timer switch 31 are selectively actuated after the pattern number setting switch 29 has been actuated. Subsequently, three figures designated are input using the numeric keys 32, whereupon the input values are displayed on the respective displays 34 to 36. As a result of pressing action of the registration key 33, pattern data are fetched from the floppy disk 24 to the CPU 22.

The CPU 22 transfers the pattern data (sewing data and feeding data) read from the floppy disk 24 to the RAM 23, and the pattern data are temporarily held in the RAM 23. The CPU 22 holds a program for executing processing shown in FIGS. 3 to 5 in its internal memory, and it issues control signals to the main shaft driver 14, the X-Y driver 17, and the milling driver 19 on the basis of the pattern data stored in the RAM 23 and detection data fed from sensors disposed on the sewing machine 3 and the X-Y moving unit 4.

The control operation of the above mentioned control system will now be described. Control operation in the sewing mode is similar to the control operation of a known sewing apparatus of the same type, and characteristic control operation in a grooving mode according to the present invention will solely be described.

Figure 3:
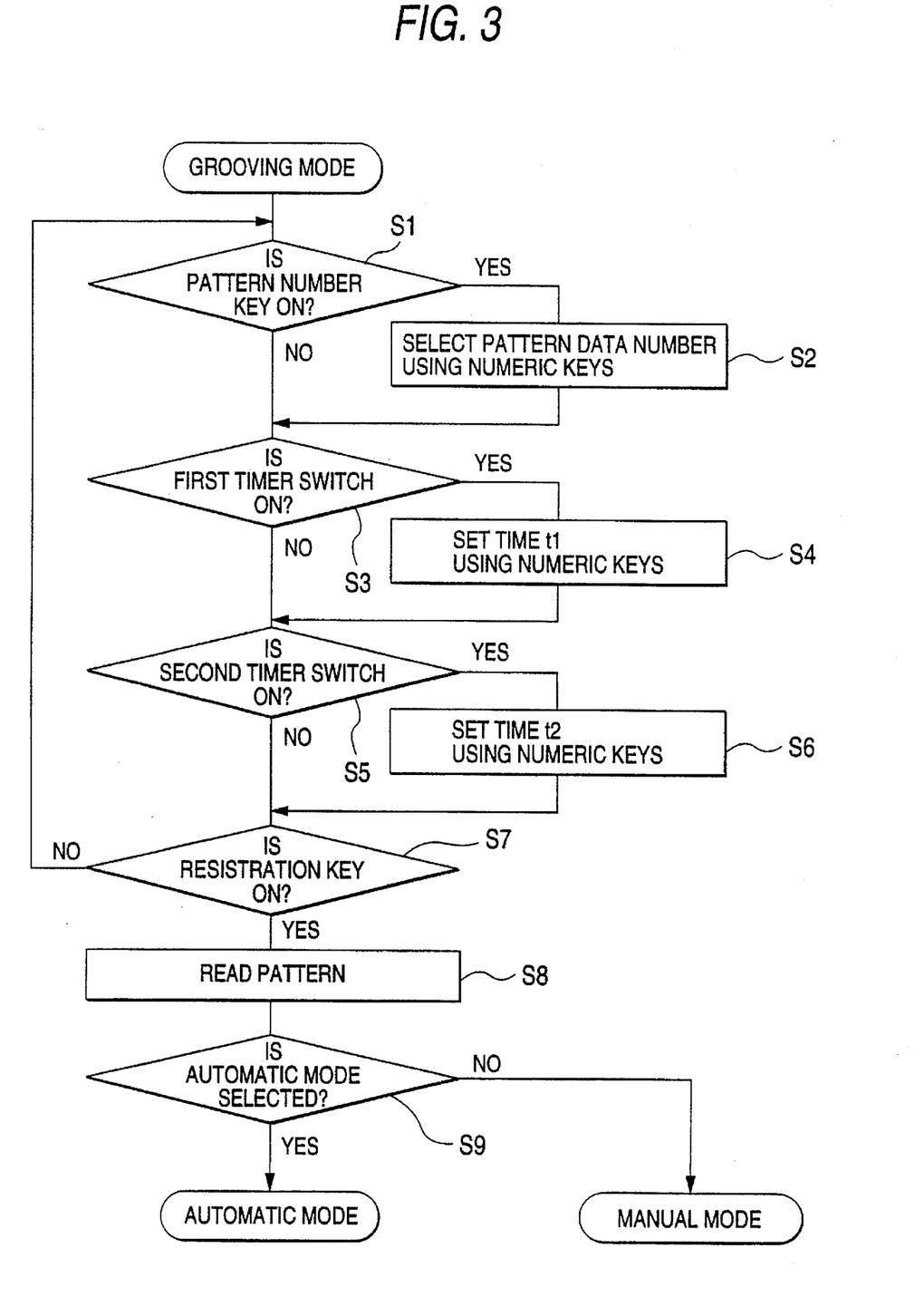
FIG. 3 is a flow chart showing a grooving mode of a control system shown in FIG. 1.

As shown in FIG. 3, to begin with, the operator turns on the pattern number setting key 29 in a grooving mode (step S1) to select a necessary pattern data number using the numeric keys 32 (step S2). If it is necessary to set the time t1 from the start of downward movement of the milling drill 10 to the start of feeding action, the first timer switch 30 is turned on (step S3) to set the time t1 using the numeric keys 32 (step S4). Further, if it is necessary to set the time t2 from the start of upward movement of the milling drill 10 to the feeding action, the second timer switch 31 is turned on (step S5) to set the time t2 using the numeric keys 32 (step S6).

The results of the previously mentioned setting are displayed on the respective displays 34, 35, and 36 on the control panel 11'. The operator checks the settings on the displays 34, 35, and 36. If any one of the settings must be changed, the operator presses the corresponding key from among the keys 29, 30, and 31 again and updates the setting using the numeric keys 32. However, unless the settings must be changed, the registration key 33 is turned on. As a result of the turning on of the registration key 33, necessary data corresponding to the settings are read from the floppy disk 24 to the CPU 22, and the thus read data are transferred to the RAM 23 which temporarily holds the data (steps S7 and S8).

Then, the mode is selected by means of the automatic/manual mode selection switch 38. The processing proceeds to a flow chart shown in FIG. 4 when the automatic mode is selected, whilst it proceeds to a flow chart shown in FIG. 5 when the manual mode is selected (step S9).

Figure 4:
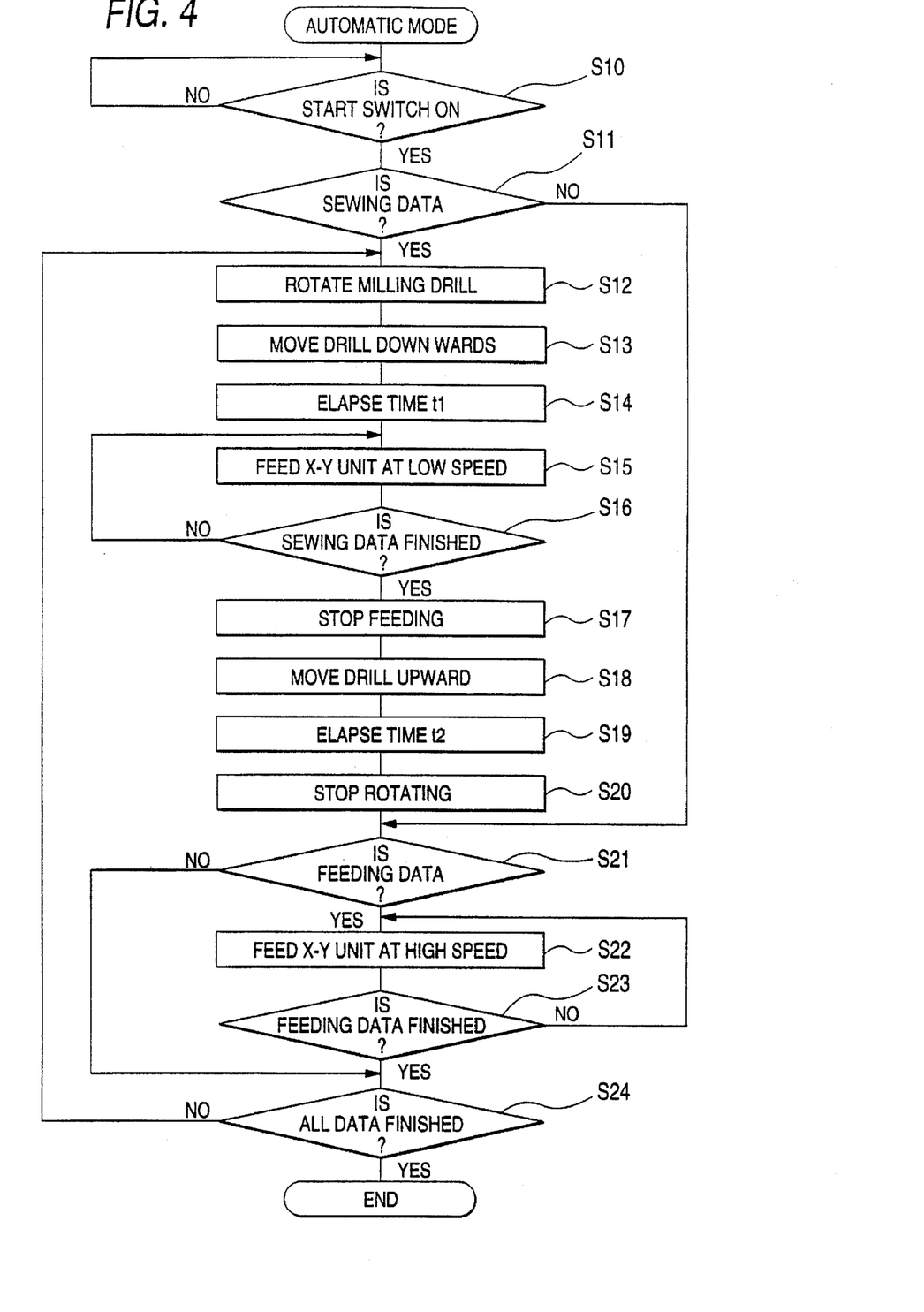
FIG. 4 is a flow chart showing an automatic mode of the control system shown in FIG. 1.

In the automatic mode, a series of operations shown in FIG. 4 are automatically executed by only switching the start switch 28 on the control panel 11'.

Specifically, when the start switch 28 is pressed (step S10), it is first checked as to whether or not data to be used are the sewing data (step S11). If the data are the sewing data, the milling drill 10 is rotated (step S12), and the vertical drive mechanism 18 is subsequently driven downwardly, whereby the milling drill 10 moves downwards (step S13). After the passage of the preset time t1 (step S14), the X-Y unit 4 is actuated at a predetermined low speed on the basis of the sewing data (step S15), whereby the slot 8 is created in the cassette 5 in accordance with the sewing pattern.

The X-Y unit 4 is stopped at the time when the execution of the sewing data is finished (steps S16 and S17). Grooving of the slot for one area to be sewed is finished at this time, and the vertical drive mechanism 18 is driven upwards immediately after the completion of the grooving operation, so that the milling drill 10 moves upwards (step S18). After the passage of the preset time t2, the rotation of the milling drill 10 is stopped (steps S19 and S20).

Subsequently, it is checked as to whether or not the data to be used are feeding data (step S21). If the data are the feeding data, only the X-Y unit 4 is actuated at a predetermined high speed on the basis of the feeding data (step S22). The X-Y unit 4 is stopped at the time when the execution of the feeding data is finished (step S23), whereby the cassette 5 is fed to the next processing start position.

Moreover, if there are another sewing data to be used, the operations in the steps S11 to S20 are executed. If there are another feeding data to be used, the operations in the steps S21 and S23 are executed.

As a result of the repetition of these operations, the grooving of the cassette is repeatedly carried out on the basis of the sewing data and the feeding data. All of the operations are terminated at the time when the execution of all the data is finished (step S24), whereby the slot 8 for areas to be sewed is formed in the cassette 5 (FIG. 6).

In this way, all the operations following the pressing action of the start switch 28 on the control panel 11' are automatically executed in this automatic mode. Therefore, it is possible to significantly reduce the number of switching action and a physical burden on the operator resulting from the switching action.

Figure 5:
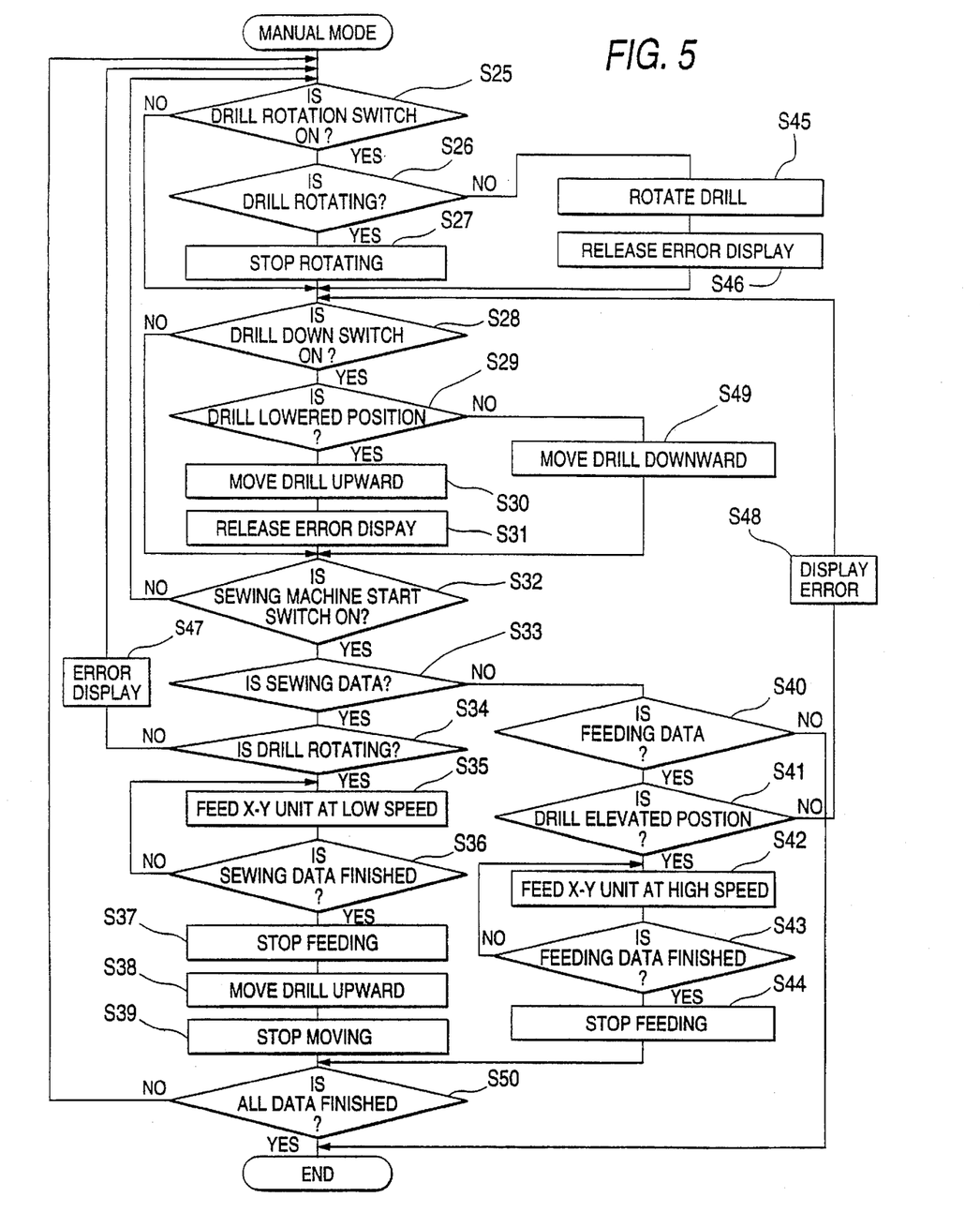
FIG. 5 is a flow chart showing a manual mode of the control system shown in FIG. 1.

The manual mode shown in FIG. 5 will now be described.

In this manual mode, substantially similar switching actions are required as the conventional sewing apparatus to groove the cassette.

Specifically, every time the cassette is grooved, the operator operates the drill rotation/stop switch 27 and the drill up/down switch 26 on the control panel 11' to rotate and move downward the milling drill 10 and, thereafter, starts the actuation of the X-Y unit 4 by operating the start switch 28 (steps S25 to S36). In this case, the actuation of the X-Y unit 4 is controlled on the basis of the sewing data as in the automatic mode, but it is fed at a slow speed.

However, in this case, the sewing apparatus is automated in such a way as to stop the X-Y unit 4 at the time when the execution of the sewing data is finished (step S37), to drive the vertical drive mechanism 18 upwardly immediately after the X-Y unit 4 has stopped, so that the milling drill 10 moves upwardly (step S38), and to stop the rotation of the milling drill 10 (step S39).

Further, if it is judged that the data to be used are the feeding data, it will be checked as to whether or not the milling drill 10 is in an elevated position. If the milling drill 10 is in a lowered position, an error message appears on an error display 37 on the control panel 11' (steps S41 and S48). On the other hand, if the milling drill 10 is in an elevated position, the X-Y unit 4 is actuated at a high speed on the basis of the feeding data in the same manner as previously mentioned (steps S42 and S43). The X-Y unit 4 is stopped (step S44) at the time when the execution of the feeding data is finished.

Furthermore, it is checked as to whether or not the milling drill 10 is in rotation during the grooving action. If an error arises, the error message appears on the error display 37 on the control panel 11' (steps S34 and S47).

In this manual mode, it is possible for the operator to rotate and move downwards the milling drill 10 by operating the switches on the control panel 11' during the grooving of the cassette for an area to be sewed. For this reason, it is possible for the operator to check the state in which the end mill 10a grooves the cassette 5 before starting the feeding of the cassette 5.

Since the sewing apparatus of the present embodiment allows the operator to select a mode using the automatic/manual mode selection switch 38, it becomes possible for the operator to check the state in which the end mill is grooving the cassette by selecting the manual mode if the cassette 5 is made of materials which may be too hard for the end mill 10a to groove. Once it is acknowledged that the end mill 10a can successfully groove the cassette 5, it is possible to reduce the number of steps of operation by selecting the automatic mode.

The present invention is not limited to the embodiment set forth above.

In the above embodiment, the timers made up of software manage the time t1 from the start of the downward movement of the milling drill 10 to the start of the feeding of the cassette and the time t2 from the start of the upward movement of the milling drill 10 to the start of the feeding of the cassette (steps S14 and S19). However, it may be possible to provide the milling unit 9 with a sensor capable of detecting the upward and downward movement of the milling drill 10, so that the actuation of the X-Y unit 4 is started as a result of sensing of the upward and downward movement of the milling drill 10 (steps S15 and S20).

In short, according to the sewing apparatus of the present invention, even when the cassette is repeatedly grooved according to the sewing data and the feeding data for repeatedly sewing the work in a pattern, grooving is automatically carried out so long as the operator performs the start operation of the grooving at the outset. As a result, it is possible to significantly reduce the number of switching action and the physical burden on the operator resulting from the switching action.

What is claimed is:

1. A sewing apparatus comprising:

a sewing mechanism;

a cassette holding a work to be sewed;

an X-Y unit for moving said cassette in a horizontal direction in relation to the sewing mechanism;

memory means for storing sewing data for actuating the X-Y unit in accordance with a sewing pattern, and for storing feeding data for feeding the X-Y unit;

a milling drill for grooving said cassette to create a slot;

a vertical drive mechanism for vertically moving said milling drill, wherein said milling drill rotates and moves downward by said vertical drive mechanism and, concurrently, said X-Y unit is actuated based on the sewing data so that said milling drill grooves said cassette to form the slot in accordance with the sewing pattern, and wherein the rotation of said milling drill stops while being moved upward by said vertical drive mechanism and, concurrently, said X-Y unit is actuated to feed said cassette based on the feeding data;

drill control means for driving said vertical drive mechanism downwardly and starting the rotation of said milling drill when said X-Y unit is actuated based on the sewing data fetched from the said memory means, and for stopping the rotation of said milling drill and upwardly driving said vertical drive mechanism when the X-Y unit is actuated based on the feeding data fetched from said memory means.

2. The sewing apparatus according to claim 1, wherein said X-Y unit is actuated based on the sewing data at a first speed, the first speed being lower than a second speed which is effected by the feeding data.

3. The sewing apparatus according to claim 1, further comprising:

a drill up/down switch coupled with said drill control means;

a drill rotation/stop switch coupled with said drill control means; and selecting means for selecting one of an automatic mode and a manual mode, wherein in the automatic mode said drill control means controls without reference to said drill up/down switch nor said drill rotation/stop switch, and in the manual mode said drill control means controls said vertical drive mechanism in accordance with said drill up/down switch and said milling drill in accordance with said drill rotation/stop switch.

4. A sewing apparatus comprising:

a sewing mechanism;

a cassette;

an X-Y unit for moving the cassette in a horizontal direction in relation to the sewing mechanism;

a memory for storing sewing data and feeding data;

a milling drill for grooving the cassette to create the sewing pattern; and a drill controller coupled to the memory and the milling drill for driving the milling drill downwardly and starting the rotation of the milling drill when the X-Y unit is actuated in accordance with the sewing data, and for stopping the rotation of the milling drill and upwardly driving the milling drill when the X-Y unit is actuated in accordance with the feeding data.

5. The sewing apparatus according to claim 4, wherein the X-Y unit is actuated at a first speed based on the sewing data, and the X-Y unit is actuated at a second speed based on the feeding data, the first speed being slower than the second speed.

6. The sewing apparatus according to claim 4, further comprising:

a drill up/down switch coupled with the drill controller;

a drill rotation/stop switch coupled with the drill controller; and a selecting device for selecting one of an automatic mode and a manual mode, wherein in the automatic mode, the drill controller controls the milling drill without reference to the drill up/down switch and the drill rotation/stop switch, and wherein in the manual mode, the drill control means controls the milling drill in accordance with the drill up/down switch and the drill rotation/stop switch.

7. The sewing apparatus according to claim 6, further comprising a sensor, the sensor detecting movement of the milling drill in the automatic mode to initiate actuation of the X-Y unit.

* * * * *